April 23, 1968     J. MERCIER     3,379,061

CALORIMETER

Filed Jan. 26, 1965

INVENTOR

Jacques Mercier

BY Alexander Mongol

ATTORNEYS

United States Patent Office 3,379,061
Patented Apr. 23, 1968

3,379,061
CALORIMETER
Jacques Mercier, Lyon, France, assignor to Societe pour la Diffusion d'Appareils de Mesure et de Controle, D.A.M., Lyon, France, a French joint-stock company
Filed Jan. 26, 1965, Ser. No. 428,149
Claims priority, application France, Jan. 28, 1964, 44,403, Patent 1,401,221
1 Claim. (Cl. 73—190)

ABSTRACT OF THE DISCLOSURE

A calorimeter for the measure of heat absorption or generation comprises a number of calorimetric cells each carrying on its periphery a thermo-sensitive electrical winding surrounded with a layer of a material of low conductivity, the latter being in contact with the wall of an individual cell-receiving chamber in a common metallic block. The chambers are in the form of upwardly opening vertical bores. The block is disposed within a shell enclosed within an outer casing having a thick inner heat-insulating layer and heating means are disposed in an intermediate space left between the said heat-insulating layer and the periphery of the shell.

The present invention relates to calorimeters and it refers more particularly to calorimeters which are used to measure the production or absorption of heat resulting from a chemical, physical or biological process by the resulting temperature difference.

Such calorimeters comprise calorimetric cells disposed within separate chambers provided in a metallic block which is kept at a given temperature, while being spaced from the inner walls of each chamber. Thermo-couples are mounted between the outer wall of each cell and the inner wall of the corresponding chamber to measure the temperature difference between the cell and the block. When the heat losses of each cell for each temperature differential have been determined, the voltage generated by the thermo-couples corresponds to the heat which flows from the cell towards the block. In practice one cell is used as a reference in order to eliminate errors resulting from an inaccurate determination of the block temperature or by minor variations thereof during the test.

These calorimeters are highly sensitive and they permit of measuring quite small heat flows as for instance $4 \times 10^{-6}$ B.t.u./hour, but their construction is expensive and they require quite skilled and careful operators. Further, their sensitiveness is much too high for most practical purposes and is therefore frequently an inconvenience rather than an advantage.

It is an object of the present invention to provide a temperature differential calorimeter which will be of simple and relatively inexpensive construction.

Another object of this invention is to provide a temperature differential calorimeter which while being substantially less sensitive than those above referred to, will be sufficient for most industrial uses and which will not repuire highly trained operators.

Yet another object of the present invention is to provide a temperature differential calorimeter which will be of compact construction and light in weight.

Still a further object of this invention is to provide a temperature differential calorimeter wherein a layer of a material of known thermal conductivity is interposed between each calorimeter cell and the metallic block in which the cells are disposed, a thermo-sensitive resistance being further disposed against the wall of each cell.

The thermo-sensitive resistance is preferably wound around the cell and it is more or less embedded in the layer interposed between same and the metallic block.

Figure 1:
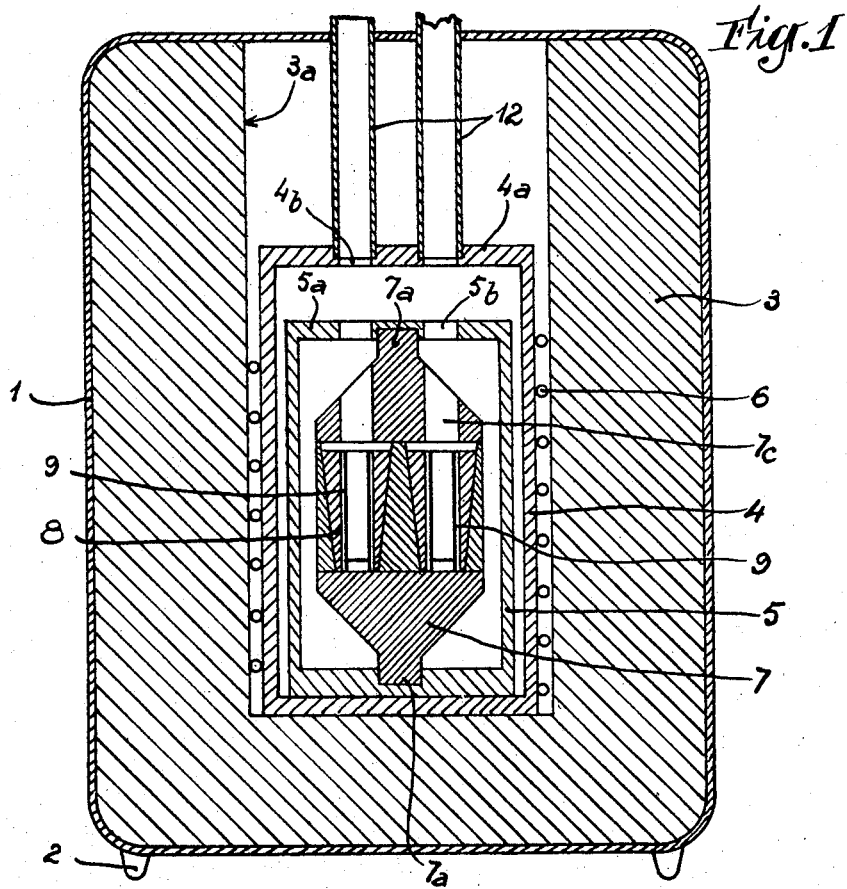
FIG. 1 is a general vertical section of a calorimeter according to this invention.

Referring to FIG. 1 the calorimeter comprises an outer casing 1 supported by foot-members such as 2. Casing 1 contains a mass 3 of a heat-insulating material which defines a central well or chamber 3a of circular cross-section, the upper end of which is closed by the upper side of casing 1, as shown. In this chamber 3a is disposed a first hollow cylindrical shell 4 which rests on the bottom of well 3a, with the upper side 4a of the said shell being situated well below the upper end of the well. Shell 4 is made of an appropriate metal such as an aluminum alloy, and it contains another hollow cylindrical shell 4, also made of aluminum or the like, which rests on the bottom of the former to which it is secured by any appropriate means, not shown. The larger shell 4 is surrounded by electrical heating elements 6.

In the smaller or inner shell 5 is mounted a metallic block 7 adapted to form an environment for the calorimetric cells, as more fully explained below. Block 7 is of cylindrical shape with two end cones terminating in trunnions 7a which are secured to the upper side and to the lower side of the inner shell 5 by appropriate means, not illustrated. Shells 4 and 5 may for instance comprise a separate bottom and a separate cover which are appropriately assembled with a hollow cylindrical body. As to block 7 itself, in the example shown it also comprises three parts, namely the intermediate cylinder and the upper and lower cones which are secured to the respective flat ends of the cylinder, as for instance by means of screws, not illustrated.

Figure 2:
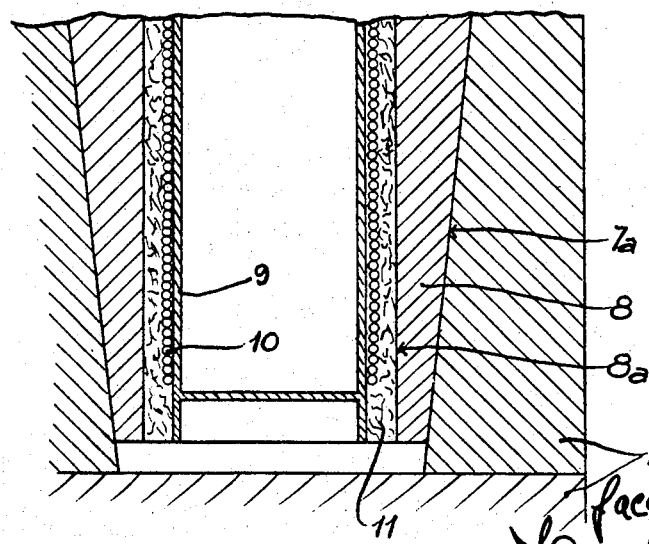
FIG. 2 is an enlarged detailed section of the lower portion of a calorimetric cell.

The central cylindrical portion of block 7 has four conical bores 7b the axes of which are situated in two vertical planes which intersect each other at right angles along the axis of the said block. In each bore 7b is disposed a hollow split conical support 8 which is a force fit therein. Each support 8 is formed with an open-ended cylindrical bore 8a in which is placed a thin sheet-metal socket 9 adapted to form a calorimetric cell, as more fully explained below. Each cell or socket 9 is of somewhat smaller diameter than the corresponding bore 8A and its periphery carries a thermo-sensitive winding 10 (FIG. 2) made of an appropriate metal or alloy the ohmic resistance of which varies in a substantial manner under the action of temperature, the successive turns of this winding being appropriately insulated from each other and from the cell wall. This winding and the cell itself are further surrounded by a layer 11 of any appropriate material such as an aggregate of asbestos, of mica, etc., which wholly fills the annular space comprised between the periphery of the cell and the wall of the corresponding bore 8a.

Each cell 9 is closed at its lower end, and the upper conical portion of block 7 is formed with a vertical cylindrical bore 7c above each bore 8a, bores 8a and 7c having substantially the same diameter. The upper side or cover 5a of the smaller or inner shell 5 has an opening 5b above each bore 7c. The cover 4a of the outer shell 4 is also formed with corresponding openings 4b in each of which is mounted the lower end of a guiding tube 12 which extends above the upper side of casing 1, its upper end being adapted to receive an appropriate removable closure member, such as a plug.

The apparatus further comprises means, not illustrated, which permit connecting the heating elements 6 and the thermo-sensitive windings 10 with appropriate external circuits.

The operation is as follows:

As in known temperature differential calorimeters, the apparatus described is used to measure any kind of heat production or absorption. The chemical, physical or biological process to be studied takes place in a small container such as a tube or bulb adapted to be introduced with a limited clearance into one of cells 9. This container may be called the sample, the cell in which it is disposed being the laboratory cell.

The inside of the apparatus is first brought to the desired environment temperature by means of heating elements 6. The latter are of course controlled by an appropriate thermostat, not illustrated, which is preferably disposed in the intermediate space comprised between shells 4 and 5. The sample itself is brought to the same temperature, as for instance by means of an oven. When the inner temperature of the apparatus is stable, the sample may be lowered into the laboratory cell. The temperature of block 7 may be measured by determining the ohmic resistance of windings 10.

It is also possible in some cases to effect the pre-heating step with the sample already disposed in the laboratory cell. The test may begin when the inner temperature has reached the desired value.

During the test the resistance of the winding 10 which surrounds the laboratory cell is measured by comparison with the resistance of the winding 10 of another cell, preferably of the cell which is diametrically opposed to the laboratory cell, and which may be called the reference cell. This comparison may be effected for instance by means of a Wheatstone bridge. It will be appreciated that any heat production or absorption by the sample being tested will determine a heat flow between the wall of the laboratory cell 9 and the metallic block 7 which forms its environment. This heat flow in turn causes a temperature difference between the cell and the block. If the temperature of the latter were perfectly constant and were known quite accurately, this difference could be determined by merely measuring the ohmic resistance of the winding 10 of the laboratory cell. But in order to avoid any error due to an inaccurate knowledge of the block temperature, it is safer to measure the difference between the said ohmic resistance and the ohmic resistance of the winding 10 of the reference cell which, since it contains no sample, is always at the same temperature as the block itself.

It is further to be noted that minor variations in the temperature of the block during the test affect both cells substantially in the same manner and are therefore without any influence on the temperature difference as measured by comparing the ohmic resistances of the windings of the laboratory cell and of the reference cell.

When the temperature difference between the laboratory cell and environment block is measured, it is possible to calculate the heat flow if the thermal conductivity of the intermediate layer 11 is known. This conductivity may be easily determined by generating heat at a given rate within a cell and by measuring the resulting temperature difference.

The apparatus described is sufficiently sensitive for most industrial tests: Windings 10 do not substantially increase the overall diameter of the cells. By appropriately selecting the material which constitutes the intermediate layer 11 it is possible to reduce the thickness of said layer while obtaining a sufficiently low heat conductivity between the cells and the block. For the same calorimetric cells the diameter of bores 8a may therefore be considerably smaller than in the known calorimeters wherein the thermo-couples disposed between the periphery of each cell and the inner wall of the metallic environment block require an important annular space. The calorimeter according to the present invention is therefore of much smaller overall diameter and of much lighter weight. Further, owing to its reduced mass, the time required for the preheating step is much shorter.

Owing to the uniformity of windings 10 around each cell, the time constant is also uniform for the whole peripheral surface thereof.

I claim:
1. A temperature differential calorimeter comprising an outer substantially cylindrical vertical casing having an upper side, a lateral wall and a bottom; and an inner heat-insulating layer disposed against the lateral wall and on the bottom of said outer casing to define within said casing an inner cylindrical space having an upper end, a lateral wall and a bottom, with said upper end closed by the upper side of said casing; heating means disposed against the lateral wall of said inner space; at least one hollow cylindrical shell disposed in said inner space, said shell having an upper side, a cylindrical body and a bottom, with said bottom of said shell resting on the bottom of the inner space defined in said outer casing by said inner heat-insulating layer, with said cylindrical body of said shell being of such diameter as to leave an intermediate space between itself and the lateral wall of said inner space, and with said cylindrical body of said shell being of such a height that said upper side of said shell is disposed well below the upper side of said outer casing, the upper side of said shell being formed with a plurality of holes; a metallic block disposed within said shell, said block being formed with a plurality of substantially cylindrical vertical chambers, each having an open upper end situated below one of the holes of the upper side of said shell, a lateral wall and a closed lower end; substantially cylindrical calorimetric cells each vertically disposed within one of the chambers of said block, each of said cells having an open upper end, a cylindrical body with a peripheral surface, and a closed lower end, with said cylindrical body being of smaller diameter than said chambers of said block; a thermo-sensitive resistance wound on the peripheral surface of each of said cells; a layer of a material of low thermal conductivity disposed between the lateral wall of each of the chambers of said block and the peripheral surface of the corresponding cell having said thermo-sensitive resistance wound thereon, said layer maintaining said cell concentric to said chamber with the lower end of said cell spaced from the bottom of said chamber; and means on the upper side of said outer casing to permit access to the holes of the upper side of said shell.

References Cited

UNITED STATES PATENTS 3,022,664    2/1962    Stolwijk    73—190
3,314,288    4/1967    Sherwin    73—190

FOREIGN PATENTS 1,368,890    6/1964    France.

JAMES J. GILL, *Primary Examiner.*
E. E. SCOTT, *Assistant Examiner.*